Aug. 3, 1954
L. P. HODGES
2,685,558
TREATMENT OF ACIDIC OILS
Filed Nov. 8, 1951
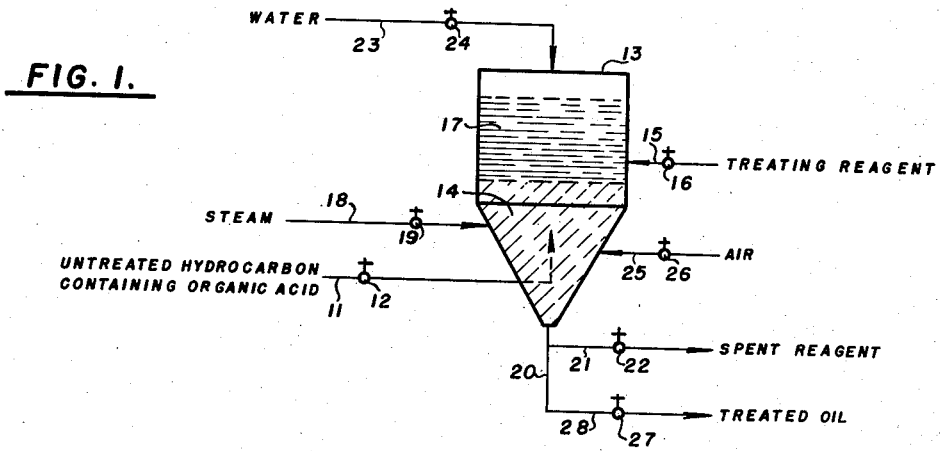
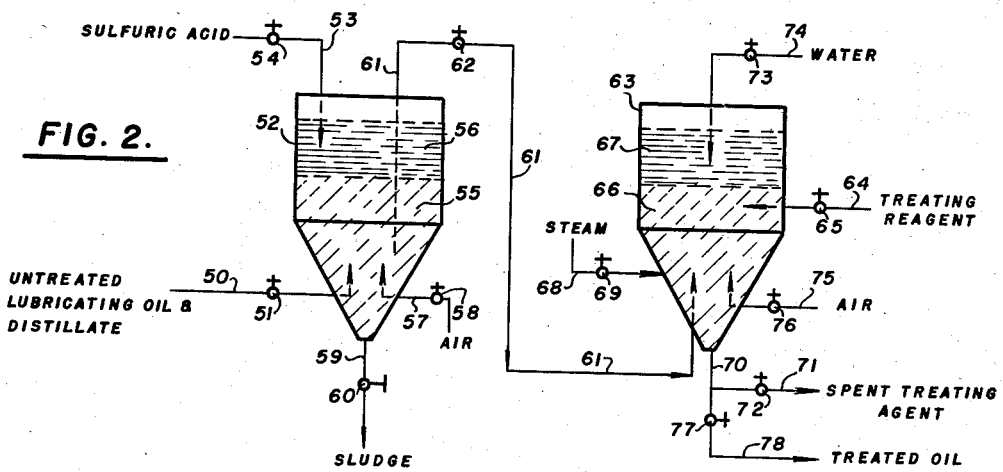
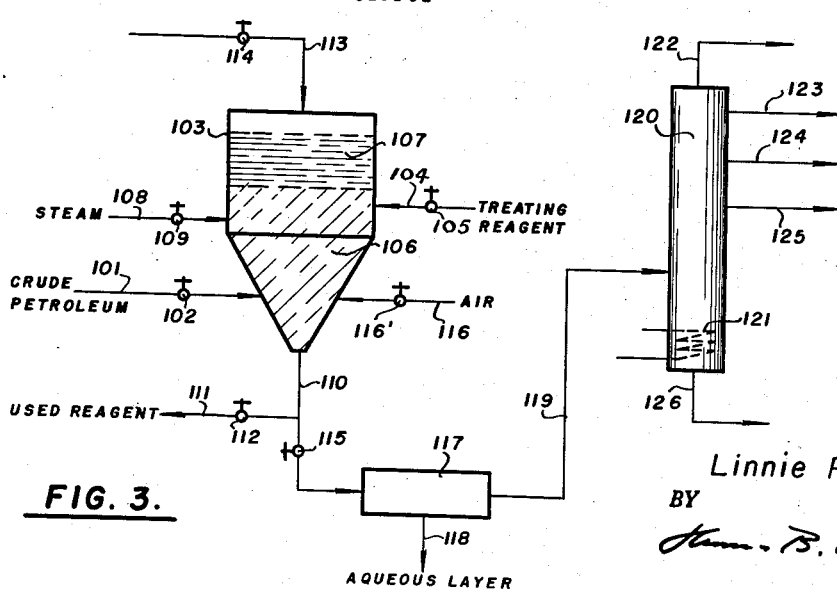
INVENTOR.
Linnie P. Hodges,
BY
AGENT

UNITED STATES PATENT OFFICE 2,685,558

TREATMENT OF ACIDIC OILS

Linnie P. Hodges, Baytown, Tex., assignor, by mesne assignments, to Standard Oil Development Company, Elizabeth, N. J., a corporation of Delaware Application November 8, 1951, Serial No. 255,464

13 Claims. (Cl. 196—41)

1

The present invention is directed to a method for treating acid-containing hydrocarbons. More particularly, the invention is directed to removal of organic and inorganic acidic bodies from hydrocarbon fractions containing them.

The present invention may be briefly described as involving the treatment of an acid-containing hydrocarbon fraction with a treating reagent comprising an aqueous solution of an alkali metal hydroxide, an alkali metal salt of an inorganic acid and an alkali metal salt of a preferentially water-soluble sulfonic acid, followed by removing the treating reagent from the contacted hydrocarbon which is substantially free of acidic bodies and recovering the contacted hydrocarbon.

The treating reagent employed in the practice of the present invention will comprise an aqueous solution of an alkali metal salt of preferentially water-soluble sulfonic acids, such as a sodium salt of sulfonic acids, an alkali metal hydroxide, such as sodium hydroxide, and an alkali metal salt of an inorganic acid, such as sodium chloride or sodium sulphate.

The water-soluble sulfonic acids from which the alkali metal salts are produced may be either an aromatic sulfonic acid or an alkyl sulfonic acid. For example, the sodium salt may be produced by neutralizing aromatic sulfonic acids resulting from the treatment of benzene, toluene, and xylene with strong sulfuric acid. A treating reagent suitable for use in the present invention has been prepared by neutralizing with sodium hydroxide the separated and settled acid oil produced in the finishing of aromatic solvents such as toluene and xylene. In this process, these aromatic hydrocarbons are formed by a hydroforming operation in which the corresponding naphthenes are converted to the aromatics. The aromatics are then purified by distillation and solvent extraction and small amounts of contaminating compounds are removed from the concentrated aromatics by treatment with sulfuric acid. The sulfuric acid sludge is separated from the aromatic hydrocarbon fraction which is then neutralized with sodium hydroxide to remove acidic bodies contained therein. The aqueous solution produced in this neutralization step has been found eminently suitable in the practice of the present invention.

The aromatic sulfonic acids may also be obtained from acid sludges resulting from acid treatment of low molecular weight lubricating oils, such as solvent oils having a viscosity of about 75 SSU at 100° F. The sulfonic acids com-

2 monly referred to in the art as the green sulfonic acids may be admirably suitable in the preparation of an alkali metal salt for use in the present invention. For example, a suitable alkali metal salt for use in the present invention has been made as follows: The acid sludge from solvent oil treating was hydrolyzed to yield an aqueous layer of weak sulfuric acid and a top layer of green sulfonic acid and oil. Two volumes of water were added to the green sulfonic acid and the resulting mixture extracted with aromatic solvents to remove oil. The resulting aqueous acidic phase was neutralized with sodium hydroxide and removed by heating and air blowing. The solution was found to contain 25 weight per cent of alkali metal sulfonate, 25 weight per cent of sodium sulfate, and 50 weight per cent of water. Free sodium hydroxide was added to the above solution in an amount of about 1% by weight. This solution was effective in the use in accordance with the present invention as will be described further.

It is also possible to employ the alkyl sulfonic acids in the preparation of the alkali metal salt to be used in my invention. For example, heptyl sulfonic acid was produced photochemically in a sulfo-chlorination reaction involving heptane. The neutralization of the heptyl sulfonic acid with sodium hydroxide resulted in an alkali metal alkyl sulfonate which, on addition of sodium sulfate and sodium hydroxide thereto in an aqueous solution formed a treating reagent admirably suitable for practicing the present invention. Other paraffinic hydrocarbons may be sulfonated to produce sulfonic acids. For example, the paraffinic hydrocarbons, such as hexane, octane, nonane, decane, undecane, dodecane and the higher members of the same homologous series may be employed as a starting material for producing sulfonic acid for use after neutralization in the treating reagent employed in my invention.

Likewise, aromatic hydrocarbons, such as benzene, toluene, or xylene may be used in preparing the alkali metal aryl sulfonates. For example, the substituted derivatives of benzene, such as tetramethylbenzene, ethylbenzene, isopropylbenzene, as well as higher members of the homologous series including both the single ring and the polycyclic aromatic hydrocarbons may be used as starting materials in preparing the aromatic sulfonic acids or aryl sulfonic acids employed as one component in the treating reagent used in my invention. At this point with regard to the employment of polycyclic aromatic hydrocarbons, it is contemplated that only those polycyclic aromatic hydrocarbons with no or only one paraffinic side chain may be employed because otherwise the polycyclic aromatic hydrocarbons with long side chains form the predominately oil-soluble sulfonic acids on sulfonation.

The treating reagent employed in the practice of the present invention should contain amounts of the several components thereof in the range of—

*Table*

|  | Percent |
|---|---|
| Alkali metal hydroxide | 0.5–5 |
| Alkali metal salt of sulfonic acid | 10–15 |
| Alkali metal salt of inorganic acid | 5–7.5 |
| Water | 72.5–84.5 |

The solution of the treating reagent should have a specific gravity no less than 1.10. Solutions of the treating reagent prior to dilution with water may range from 1.2 to 1.3 in specific gravity.

The inorganic salt in the treating reagent is believed to confer gravity differential between the oil being treated and the treating reagent which facilitates settling and prevents emulsions. For example, it has been shown that treating reagents omitting alkali metal salt of the inorganic acid but including alkali metal salt of aryl sulfonic acid and alkali metal hydroxide in water were unsatisfactory but when alkali metal salt of inorganic acid, such as sodium sulfate, was present, satisfactory results were obtained. Likewise satisfactory results are obtained in the practice of the present invention when the alkali metal salt of inorganic acid is sodium chloride.

The alkali metal salt of sulfonic acid is believed to act as a solutizer for the alkali metal salts of organic and inorganic acids which result from the neutralization of such acidity with the free alkali metal hydroxide in the treating reagent.

Thus if the alkali metal salt of the sulfonic acid is omitted the salts resulting from neutralization of organic and inorganic acidity of the oil being treated may remain in the oil and contribute to unsatisfactory results in that emulsions may be easily formed around such salts as nuclei for water and the presence of such salts might have a deleterious effect on the use to which the oil is put.

The small amounts of alkali metal hydroxide in the treating reagent employed in my invention allows neutralization of organic and inorganic acidity and, by virtue of the presence of the alkali metal salt of sulfonic acid and the alkali metal salt of inorganic acid, is effective in neutralizing substantially large quantities of organic and inorganic acidity which in conventional methods consume substantially larger quantities of alkali metal hydroxide than is consumed in my invention.

In short, in the practice of the present invention it is necessary to employ an aqueous solution having a specific gravity no less than 1.10%, alkali metal hydroxide in small quantities as set out above, alkali metal salt of sulfonic acid and alkali metal salt of inorganic acid to obtain the beneficial results to which the present invention is directed. If a treating agent having a specific gravity less than 1.10% is employed and if a treating reagent is used which omits either the alkali metal salt of inorganic acid or the alkali metal salt of sulfonic acid, unsatisfactory results are obtained in that tight emulsions are formed and neutralization is ineffective.

The feed stocks to be employed in my invention will comprise ordinarily hydrocarbons containing acidic bodies, such as inorganic acidic material or organic acidic materials. For example, crude petroleum containing naphthenic acids and other organic acids may form the feed stock to my process. Sulfuric acid, sulfuric anhydride, and other mineral acid treated stocks may also be treated in accordance with the present invention. Solvent extracted stocks may also form the feed stock to my process. There are many synthetic naphthas produced in conversion processes in the petroleum and allied industries. For example, the Fischer-Tropsch process results in the formation of a synthetic naphtha or crude petroleum containing substantial amounts of organic acids which may be removed in accordance with my invention. It is also contemplated that lubricating oils containing inorganic or organic acidity may be treated in accordance with my invention. It is contemplated further that various petroleum fractions and other hydrocarbons containing acidic sulfur compounds may be suitably treated to remove the acid bodies.

There are many petroleum fractions which are treated with acid such as sulfuric acid dissolved in a suitable hydrocarbon. For example, it is not uncommon to treat lubricating oil in a diluent, such as propane, butane, pentane, hexane, mixtures thereof, and the like with sulfuric acid and other acids. Such solutions may contain inorganic and organic acidity and I contemplate that as feed stocks to my process may be solutions of the hydrocarbon fractions or petroleum fractions to be treated and light hydrocarbons, such as those enumerated before.

The conditions to be employed in the practice of my invention embrace temperatures in the range from 40° to 210° F. Good results may be obtained at temperatures ranging from about 150° to 200° F. Ordinarily atmospheric pressure will be used but when the hydrocarbon containing acidic bodies is treated in a solution in a light hydrocarbon it may be desirable to impose a higher pressure which is intended to encompass a sufficient pressure to maintain a liquid phase. The pressure may be easily determined by the vapor pressure of the mixture or solution being treated.

The amount of treating reagent to be employed in my invention may range from about 5% by volume based on the oil being treated to about 20% by volume. Quite satisfactory results may be obtained employing amounts ranging from 5% to 10% by volume.

The treating reagent employed in the practice of my invention may be contacted with the acid-containing hydrocarbon in any suitable equipment. For example, it may be contacted with the acid-containing hydrocarbon in suitable kettles provided with facilities for agitation and contacting the oil with the treating reagent. For example, the contacting may be conducted by blowing the treating reagent and oil with air, steam, and other vaporous or gaseous materials or the contact may be assured by mechanical agitation with agitators employing stirrers and the like. It is contemplated that the contacting operation may also be conducted in equipment in which internal baffling means are provided, such as packings of the type of Raschig rings, trays, and any other contacting equipment well known in the art. It may be desirable to conduct the contacting operation in an incorporator provided with baffles or in a centrifugal pump. It is intended to include in the means for contacting all contacting equipment known to achieve intimate contacts between immiscible liquids.

It is desirable that a sufficient time be allowed for contact of the acid-containing hydrocarbon with the treating reagent. Ordinarily a time within the range from about 5 minutes to about 30 minutes will be desirable. Contacting times of the order of from 15 minutes to 30 minutes may give best results.

The invention will be further illustrated by reference to the drawing in which

Figure 1 is a flow diagram of one mode of practicing my invention in which untreated hydrocarbons containing acid bodies are treated;

Figure 2 is another mode of practicing the present invention illustrating the removal of inorganic acid from lubricating oil distillates and the like; and, Figure 3 illustrates a still further mode of the present invention in which crude petroleum is freed from naphthenic acids and then distilled.

Referring now to the drawing and especially to Figure 1, numeral 11 designates a charge line by way of which an untreated hydrocarbon containing, for example, organic acids is introduced into the system. This untreated hydrocarbon may be natural petroleum or a synthetic petroleum or a lubricating oil fraction, and the like. For purposes of this description, assume that untreated lubricating oil fraction containing naphthenic acids is introduced from a source, not shown, by line 11 controlled by valve 12 into a kettle 13. Kettle 13 has arranged therein a body 14 of treating reagent comprising an aqueous solution of sodium hydroxide, sodium aryl sulfonate and sodium sulfate which is introduced thereto from a source, not shown, by line 15 controlled by valve 16. The untreated hydrocarbon oil is introduced by line 11, as has been described, and forms an upper layer in the kettle 13 indicated generally by the numeral 17. Steam is then introduced into the kettle 13 by line 18 controlled by valve 19 to raise the temperature of the body of oil and treating reagent to a temperature approaching the boiling point of water. Steam is conducted into the kettle 13 during the time of contacting to provide agitation for the contents of kettle 13 and also to maintain the temperature in the range indicated to allow the organic acidity to be neutralized by the treating reagent. By way of explanation, it must be stated that when such neutralization was tried heretofore, emulsion difficulties were encountered by the use of an alkali metal hydroxide solution or other alkaline reagents not encompassed by the treating reagent employed in the present invention. After the contacting operation has been terminated, the treating reagent is withdrawn by line 20 into line 21 controlled by valve 22 and may be discarded or used in subsequent treating operations. Water is then introduced into the kettle 13 by line 23 controlled by valve 24 and air injection begun through line 25 controlled by valve 26. This causes the contacted oil to be washed by the water and causes coagulation of any foreign bodies in the aqueous layer. In the foregoing description, of course, it is assumed that valve 22 in line 21 is closed while the air blowing operation is conducted. After the air blowing operation is conducted, which may range for a time of about 15 minutes to 30 minutes, the air is cut off by closing valve 26. The treated distillate may then be withdrawn from the kettle 13 by opening valve 27 in line 28. The treated oil may then be used in preparation of finished products. If the untreated oil charged to the kettle 13 by line 11 is a lubricating oil distillate, it may be desirable to continue blowing with air until the oil is blown bright indicating substantially complete removal of moisture.

Referring now to Figure 2, in this mode of my invention an untreated oil, such as an untreated lubricating oil distillate, is charged into the system from a source, not shown, by line 50 controlled by valve 51. The oil is introduced into a kettle 52. Thereafter sulfuric acid having a strength of about 98% $H_2SO_4$ is introduced into kettle 52 by line 53 from a source, not shown. Line 53 is controlled by valve 54. While commercially available sulfuric acid may be employed, it is contemplated that acids available in the petroleum refinery may be used. For example, spent alkylation acid may be employed wholly or in part as the acid introduced by line 53. The acid in kettle 52 forms a lower layer indicated generally by the shaded portion and designated by numeral 55 and the oil forms an upper layer indicated by the numeral 56. Contact between the acid and the oil layer is effected by introducing air into the kettle 52 by line 57 controlled by valve 58. After a period of contact which will include a time of 5 to 45 minutes, the resulting sludge formed by reaction of the sulfuric acid with the reactable components of the oil is drawn off from kettle 52 by line 59 controlled by valve 60. This sludge may be used to treat other petroleum products or it may be sent to a suitable acid concentration system as may be desired. The acid treated oil is withdrawn from kettle 52 by line 61 controlled by valve 62 and introduced into a second kettle 63 which is similar to kettle 13 of Fig. 1 and, like kettle 13, is provided with equipment to allow removal of acidic bodies from the acid treated oil. The acid treated oil is introduced into the kettle 63 by line 61 as has been described after the treating reagent has been introduced thereto by line 64 controlled by valve 65, the treating reagent being indicated by the shaded portion designated by numeral 66 while the oil introduced by line 61 is designated by numeral 67.

Steam is then introduced into kettle 63 by line 68 controlled by valve 69 to raise the temperature to the desired level and to provide agitation of the contents of kettle 63 and to provide intimate contact between the treating reagent and the acidic oil. Of course, where I mention treating reagent, it is understood that the treating reagent is an aqueous solution of alkali metal hydroxide, alkali metal salt of an inorganic acid, and alkali metal salts of a preferentially water-soluble sulfonic acid. After the time of contact specified before, such as in the description taken in regard to Fig. 1, the treating reagent is withdrawn from kettle 63 by line 70 and line 71 controlled by valve 72. Water is then introduced by opening valve 73 in line 74 and air agitation is begun by introducing air into kettle 63 by line 75 by opening valve 76. After a sufficient period of air agitation, the introduction of air is discontinued by closing valve 76 and the treated oil is withdrawn from kettle 63 by opening valve 77 in line 78 allowing the oil to be withdrawn for future use as desired by line 78.

Referring now to Fig. 3, an embodiment will be described in which crude petroleum or other acidic-containing oil is treated in accordance with my invention. Crude petroleum is introduced into the system from a source, not shown, by line 101 controlled by valve 102. The crude petroleum contains naphthenic acids and other acid bodies and is introduced by line 101 into kettle 103. Prior to the introduction of the crude petroleum, treating reagent was introduced thereto by line 104 controlled by valve 105. The treating reagent in kettle 103 is designated by the shaded portion which is indicated by the numeral 106 while the oil introduced by line 101 is designated by numeral 107. While in the several modes of my invention taken with the several figures of the drawing I have mentioned that the oil is introduced subsequent to the treating reagent actually it is immaterial whether the oil or treating reagent is introduced first. In any event, a body of both treating reagent and oil is provided in the agitator 103. Steam is then introduced into the agitator 103 by line 108 controlled by valve 109 to raise the temperature of the contents of kettle 103 to a temperature in the range indicated approaching the boiling point of water and to provide contact between the treating reagent and the oil. In kettle 103 the contacting operation is continued until the acidic bodies have been removed by the treating reagent and the treating reagent is then withdrawn by line 110 and connecting line 111 controlled by valve 112, the treating reagent being discarded or used in a process or used in a subsequent recovery operation. Water sufficient to wash the contacted oil is then introduced into kettle 103 by line 113 controlled by valve 114 and then, like in the previous modes of my invention, air is introduced by line 116 controlled by valve 116' to agitate the mixture of oil and water to cause coagulation and removal of water-soluble bodies not removed by the treating reagent. The mixture of water and contacted oil is then discharged by opening valve 115 in line 110 which allows discharge of the oil and water into a settling zone 117 which is of sufficient capacity to allow separation of water from the contacted oil, the water being discharged from the system by line 118. The contacted oil from which water has been separated in line 118 is withdrawn from settling zone 117 by line 119 and discharged thereby into a distillation zone 120. Distillation zone 120 may be a plurality of fractional distillation towers but for simplicity of description and for purposes of this illustration is shown as a single distillation tower provided with a suitable heating means illustrated by coil 121. Distillation tower 120 will be assumed to be provided with all auxiliary equipment necessary to a modern distillation tower and will contain means for inducing reflux therein and will also include means for providing intimate contact between liquids and vapors. Such contacting equipment will usually comprise internal baffling equipment including bell cap trays and the like. Distillation tower 120 is provided with line 122 for removal of an overhead fraction and with lines 123, 124, and 125 for withdrawal of side streams. A bottoms fraction may be withdrawn by line 126. By way of explanation, the feature of this mode of my invention is the treatment for removal of organic acids, such as naphthenic acids, and subsequent distillation without formation of emulsions which are carried over to the distillation step. Heretofore when crude petroleums and the like containing substantial amounts of naphthenic acids were treated with alkali metal hydroxide solutions and distilled the distillation operation frequently became inoperable due to carry over of emulsions resulting in the treating operation. In my invention emulsion difficulties are not encountered and the organic acids are removed.

The invention will be further illustrated by reference to the following operations in which lubricating oil distillates from Coastal crude were treated with a treating reagent having the following approximate composition:

Table I

| Component | Weight Percent |
| --- | --- |
| Sodium Sulfonates | 30 |
| Sodium Sulfate | 10 |
| Free Sodium Hydroxide | 1 |
| Water | 59 |
| | 100 |

By contacting the lubricating oil distillate from Coastal crude with the treating reagent having the foregoing composition, it was possible to reduce the neutralization value of the distillate from a value of 1.2 to 1.3 to as low as 0.03. By treating the Coastal distillate with treating reagent at 180° F. it was found that the amount of treating reagent could be reduced by adding sodium hydroxide to the treating reagent. It was further found that the neturalization value of the lubricating oil distillate could be reduced to below 0.1 by treating with as little as 5 volume per cent of a solution having the foregoing composition which had been diluted with an equal volume of water and sufficient sodium hydroxide added to cause reaction of the acidity with the oil.

By way of explanation, the sodium sulfonates given in Table I were sodium aryl sulfonates formed by neutralization of the acidity resulting from treatment of toluene and xylene with strong sulfuric acid.

In another operation in connection with the present invention, a lubricating oil distillate from Coastal crude having a neutralization value of 1.5 was treated with 3 pounds of sulfuric acid as a cutter dump followed by a 15-pound treat of 98% sulfuric acid $H_2SO_4$. The acid oil was then treated by agitating it at 200° F. with 5 volume per cent of a mixture of the treating reagent given in Table I with water. A clean rapid break was obtained after the agitation period and the neutralized oil was subsequently washed with hot water and steam without any emulsion formation. The washed oil was blown dry with air at 180° F. A similar treat was performed except that instead of the treating reagent employed in the present invention an aqueous solution of sodium hydroxide having a 50 Bé. gravity was used. In the folowing table a comparison of the results obtained on testing the oil in conventional operations and in the present invention is given.

Table II

| Process | Conventional | Present Invention |
| --- | --- | --- |
| Gravity, °A P I | 22.5 | 23.1 |
| Flash, ° F | 430 | 420 |
| Vis. at 100° F., S. S. U | 575 | 555 |
| V. I | 40 | 43 |
| Color, Tag-Robinson | 10¾ | 11¼ |
| Colorhold | 9¾ | 10 |
| Neut. Value | 0.025 | 0.04 |
| S. E. No | 245 | 200 |
| Conradson Carbon | 0.06 | 0.05 |
| Corrosion, 3 Hrs. at 212° F | #3 | #3 |

It will be noted that the present invention allowed the obtaining of a neutralization value of 0.04, whereas in conventional operation neutralization value was 0.025 but emulsion difficulties were encountered.

In another run in accordance with the present invention a Coastal crude oil was treated at 78° F. with a 10 volume per cent treat of treating reagent composed of sodium aryl sulfonates, sodium sulfate, and sodium hydroxide and water. Table III gives a comparison of the neutralization value of the untreated crude and the crude treated in accordance with the present invention.

*Table III*

|  | Raw Crude | Treated Crude* |
| --- | --- | --- |
| Neutralization Number | 0.78 | 0.02 |
| Water Soluble Ash, Percent | 0.02 | 0.02 |

*Inspected after 16 hours' settling.

It was also found that Coastal crude oil could be treated with 5 volume per cent treat at a higher treating temperature which effects a substantial reduction in settling time. Besides removing naphthenic acids from crude oil it has been observed that a 10 volume per cent treat of a treating reagent having a composition such as given before reducing the salt content of crudes from 12 parts per million to 0 part per million.

One of the great advantages of the present invention besides removing acidic bodies, such as organic or inorganic acidity including acidic sulfur compounds, is the fact that the acidic bodies may be removed by employing a treating reagent in accordance with my invention without the formation of emulsions. This problem is a serious one and results in the consumption of valuable operating time in the petroleum refinery and besides ties up a considerable amount of equipment which requires as a necessary concomitant thereto large capital investments which my ivention obviates.

The nature and objects of the present invention having been completely described and illustrated, what I wish to claim as new and useful and to secure by Letters Patent is:

1. A method for neutralizing a petroleum lubricating oil which has been treated with sulfuric acid under conditions to form a hydrocarbon layer and an acid layer, which comprises separating a hydrocarbon layer containing acidic bodies selected from the group conisting of naphthenic, sulfonic and inorganic acids from the acid layer, contacting the hydrocarbon layer at a temperature in the range between 40° and 210° F. and at a pressure sufficient to maintain a liquid phase with a treating reagent comprising an aqueous solution of an alkali metal hydroxide, an alkali metal salt of an inorganic acid, and an alkali metal salt of a preferentially water-soluble aromatic sulfonic acid, said treating reagent having a specific gravity no less than 1.1 under conditions to remove acidic bodies selected from the group consisting of naphthenic, sulfonic and inorganic acids from said hydrocarbon layer, separating the treating reagent from said contacted hydrocarbon layer and recovering said contacted hydrocarbon layer substantially free of said acidic bodies.

2. A method in accordance with claim 1 in which the alkali metal is sodium.

3. A method for neutralizing a petroleum lubricating oil which has been treated with sulfuric acid in admixture with a diluent hydrocarbon having from 1 to 5 carbon atoms in the molecule under conditions to form a hydrocarbon layer and an acid layer, which comprises separating a hydrocarbon layer containing acidic bodies selected from the group consisting of naphthenic, sulfonic and inorganic acids from the acid layer, contacting the hydrocarbon layer at a temperature in the range between 40° and 210° F. and at a pressure sufficient to maintain a liquid phase with a treating reagent comprising an aqueous solution of an alkali metal hydroxide, an alkali metal salt of an inorganic acid, and an alkali metal salt of a preferentially water-soluble aromatic sulfonic acid, said treating reagent having a specific gravity no less than 1.1, under conditions to remove acidic bodies selected from the group consisting of naphthenic, sulfonic and inorganic acids from said hydrocarbon layer, separating a treating reagent from said contacted hydrocarbon layer and recovering said contacted hydrocarbon layer substantially free of acidic bodies.

4. A process in accordance with claim 3 in which the alkali metal is sodium.

5. A process in accordance with claim 3 in which the diluent hydrocarbon is propane.

6. A method in accordance with claim 3 in which the diluent hydrocarbon is butane.

7. A method for neutralizing an acid-containing petroleum hydrocarbon which comprises contacting a high boiling petroleum hydrocarbon containing fractions boiling in the lubricating oil boiling range and containing acidic bodies selected from the group consisting of naphthenic, sulfonic, and inorganic acids with a treating reagent comprising an aqueous solution of an alkali metal hydroxide, an alkali metal salt of an inorganic acid, and an alkali metal salt of a preferentially water-soluble aromatic sulfonic acid, said solution having a specific gravity of no less than 1.1 at a temperature in the range from 40° to 210° F. and at a pressure sufficient to maintain a liquid phase under conditions to cause substantial removal of acidic bodies selected from the group consisting of naphthenic, sulfonic and inorganic acids, from said petroleum hydrocarbon, separating the treating reagent from said contacted petroleum hydrocarbon and distilling said contacted petroleum hydrocarbon to recover at least a fraction substantially free of said acidic bodies.

8. A method for neutralizing a high boiling petroleum hydrocarbon containing fractions boiling in the lubricating oil boiling range and containing acidic bodies selected from the group consisting of napthenic, sulfonic and inorganic acids which comprises contacting said high boiling petroleum hydrocarbons at a temperature in the range between 40° and 210° F. and at a pressure sufficient to maintain a liquid phase with a treating reagent comprising an aqueous solution containing an alkali metal hydroxide in an amount in the range from 0.5% to 5% by weight of alkali metal hydroxide, an alkali metal salt of an inorganic acid in an amount in the range from 5% to 15% by weight and an alkali metal salt of a preferentially water-soluble aromatic sulfonic acid in an amount in the range between 10% and 30% by weight under conditions to remove said acidic bodies from said hydrocarbon, said solution having a specific gravity no less than 1.1 separating contacted hydrocarbons from said treating reagent and recovering said contacted hydrocarbon substantially free of said acidic bodies.

9. A method in accordance with claim 8 in which the alkali metal is sodium and the sulfonic acid is xylene sulfonic acid.

10. A method in accordance with claim 8 in which the alkali metal is sodium and the sulfonic acid is toluene sulfonic acid.

11. A method in accordance with claim 8 in which the high boiling hydrocarbon is a lubricating oil fraction.

12. A method in accordance with claim 8 in which the high boiling hydrocarbon is a crude petroleum.

13. A method for treating crude petroleum which comprises contacting a Coastal crude oil at a temperature in the range between 40° and 210° F. in the liquid phase with a treating reagent comprising an aqueous solution containing an alkali metal hydroxide in an amount in the range from .05% to 5% by weight, an alkali metal salt of an inorganic acid in an amount in the range from 5% to 15% by weight, and an alkali metal salt of a preferentially water soluble aromatic sulfonic acid in an amount in the range between 10% and 30% by weight under conditions to remove acidic bodies selected from the group consisting of naphthenic, sulfonic and inorganic acids from said crude, said solution having a specific gravity no less than 1.1, separating said contacted crude from said treating reagent, recovering said contacted crude substantially free of said acidic bodies, and distilling said contacted crude.

References Cited in the file of this patent

UNITED STATES PATENTS

| Number | Name | Date |
|---|---|---|
| 1,562,156 | Faber | Nov. 17, 1925 |
| 1,669,944 | McMichael | May 15, 1928 |
| 1,696,377 | Black et al. | Dec. 25, 1928 |
| 2,219,109 | McCormick | Oct. 22, 1940 |
| 2,400,373 | Schultze | May 14, 1946 |